United States Patent [19]

Ty

[11] 4,402,454
[45] Sep. 6, 1983

[54] GAS FLUE DAMPER AND THERMOSTAT METAL THEREFORE

[75] Inventor: Henry Ty, Attleboro, Mass.

[73] Assignee: Texas Instruments Incorporated, Dallas, Tex.

[21] Appl. No.: 307,822

[22] Filed: Oct. 2, 1981

Related U.S. Application Data

[63] Continuation of Ser. No. 117,895, Feb. 1, 1980, abandoned.

[51] Int. Cl.³ ............................................ G05D 23/08
[52] U.S. Cl. .................................... 236/1 G; 428/617
[58] Field of Search ............... 428/617, 619, 682, 683, 428/685; 236/1 G, 93 R

[56] References Cited

U.S. PATENT DOCUMENTS

| | | | |
|---|---|---|---|
| 2,461,518 | 2/1949 | Chace | 428/682 X |
| 2,962,806 | 12/1960 | Stumbock | 428/617 |
| 3,512,947 | 5/1970 | Alban | 428/617 |
| 3,876,819 | 4/1975 | Boyd et al. | 428/685 X |
| 4,131,720 | 12/1978 | Spengler | 428/682 X |

4,191,326  3/1980  Diermayer et al. ............... 236/1 G

*Primary Examiner*—William E. Tapolcai
*Attorney, Agent, or Firm*—James P. McAndrews; John A. Haug; Melvin Sharp

[57] ABSTRACT

A thermally responsive damper for opening the flue of a gas-fired apparatus when gas firing occurs and for otherwise closing the flue to prevent unnecessary energy losses utilizes a low cost, high flexivity, thermostat metal adapted to operate in the corrosive flue environment, the thermostat metal having a high expansion layer of a corrosion-resistant austenitic stainless steel which does not transform as it is worked during manufacture of the thermostat metal and a low expansion layer of an alloy of 36 percent nickel and the balance iron. The thermostat metal also has a thin layer of a stabilized, high chromium, ferritic stainless steel on the outer surface of the lower expansion layer for protecting the low expansion layer from corrosion in the flue gasses and for permitting the achievement of high flexivity in the thermostat metal while also permitting economical manufacture of the composite material.

5 Claims, 4 Drawing Figures

GAS FLUE DAMPER AND THERMOSTAT METAL THEREFORE

This is a continuation, of application Ser. No. 117,895, filed Feb. 1, 1980, now abandoned.

BACKGROUND OF THE INVENTION

The invention relates to a thermostat metal damper means for the flue of a gas-fired apparatus such as a home water heater and the like.

Gas-fired home appliances such as gas hot water heaters and furnaces have flues which vent gaseous combustion products from the appliances outside the home. In conventional appliances, thermally responsive dampers open the flue when gas firing occurs but close the vent when no gas firing is taking place. In that way, the damper provides the necessary venting but avoids heat loss from the hot water tank or the like through the flue and also avoids the entry of cold outside air into the home. In a typical gas vent damper, for example, vanes of thermostat metal are arranged to extend over the flue to block venting through the flue when the vane temperatures are below a selected level. However the vanes are positioned to be heated when gas combustion occurs for flexing to positions which open the flue vent. The vanes remain open as long as gas firing continues and automatically return to their original position closing the flue when the vanes cool after gas-firing is terminated.

In the typical gas vent damper as thus described, the thermostat metals which have been used have provided the desired temperature response over a long service life despite the corrosive gas flue environment to which the damper vanes have been exposed. However, the thermostat metals have been expensive, have employed metal alloys which are not widely available, and have incorporated substantial proportions of materials such as cobalt which are in relatively short supply. In the present energy crisis when it can be anticipated that such vent dampers for gas-fired appliances will find more widespread use and when the demand for such thermostat metals can be expected to substantially increase, it would be desirable to provide an improved vent damper and a thermostat metal for use in such a damper utilizing less expensive, more widely available metal alloys which do not incorporate large constituents of materials which are difficult or expensive to obtain.

SUMMARY OF THE INVENTION

It is an object of this invention to provide a novel and improved gas vent damper which utilizes a relatively less expensive thermostat metal incorporating metal materials which are commercially available from a wide variety of sources; to provide such an improved thermostat metal which is adapted for use in corrosive flue gas environments and the like; and to provide such a thermostat metal which provides high flexivity, which is easily manufactured and which is readily weldable for assembly in a vent damper assembly or other thermostat metal device. Briefly described, the novel and improved thermostat metal of this invention comprises thermally responsive damper means to be mounted in the flue of gas fired appliance or the like for movement between flue-opening and flue-closing positions in response to temperature change. Typically the damper means embody thermostat metal vanes which are positioned to manually block the flue but which are adapted to be heated and to flex to a flue-opening position when gas-firing takes place. The damper means embody a novel and improved composite thermostat metal having a first layer of a particular metal of relatively high coefficient of thermal expansion metallurgically bonded to one side of a second layer of metal of relatively lower coefficient of thermal expansion. The first layer metal is selected from the group of austenitic stainless steels such as AISI 305 Stainless Steel which display a high thermal expansion coefficient, which are substantially free of transformation during work-hardening, and which are highly resistant to corrosion in the flue environment of a gas-fired apparatus. The second layer of metal incorporates the material commonly called invar which has a nominal composition by weight of 36 percent nickel and the balance iron, that metal material being adapted to be easily and reliably bonded to the first layer metal by conventional roll bonding techniques and having a very low coefficient of thermal expansion such that selected thicknesses of the first and second metal layers provide the composite thermostat metal with suitably high flexivity for economical use in a flue damper application. In accordance with this invention, the novel and improved composite thermostat metal further incorporates a relatively thin third layer of metal selected from the group of stabilized, high chromium, ferritic stainless steel such as AISI 430 Ti Stainless Steel which is metallurgically bonded to the opposite side of the second metal layer, that third metal layer being selected to provide corrosion protection for the second metal layer in the noted flue environment of a gas-fired apparatus while also having a suitably low coefficient of thermal expansion to be incorporated over the low expansion side of the thermostat metal without severely reducing the flexivity of the composite metal and while also being adapted to be metallurgically bonded to the second metal layer and to be otherwise processed with the first and second layers materials using conventional bonding techniques and the like.

In that way, a low cost three-component composite thermostat metal having suitable corrosion resistance and flexivity is provided for use in a gas vent damper for a gas-fired apparatus. The thermostat metal incorporates metal alloys which are widely available at relatively low cost and which do not require large portions of materials which are in short supply. The thermostat metal is also adapted to be economically manufactured at low cost. The thermostat metal is also adapted to be readily welded in a damper assembly. Accordingly, a novel and improved, low cost thermostat metal and gas vent damper means incorporating such thermostat metals are achieved.

BRIEF DESCRIPTION OF THE DRAWING

Other objects, advantages and details of the novel and improved thermostat metal and damper means of this invention appear in the following detailed description of preferred embodiments of the invention, the detailed description referring to the drawings to which.

DESCRIPTION OF THE PREFERRED EMBODIMENTS

Figure 1:
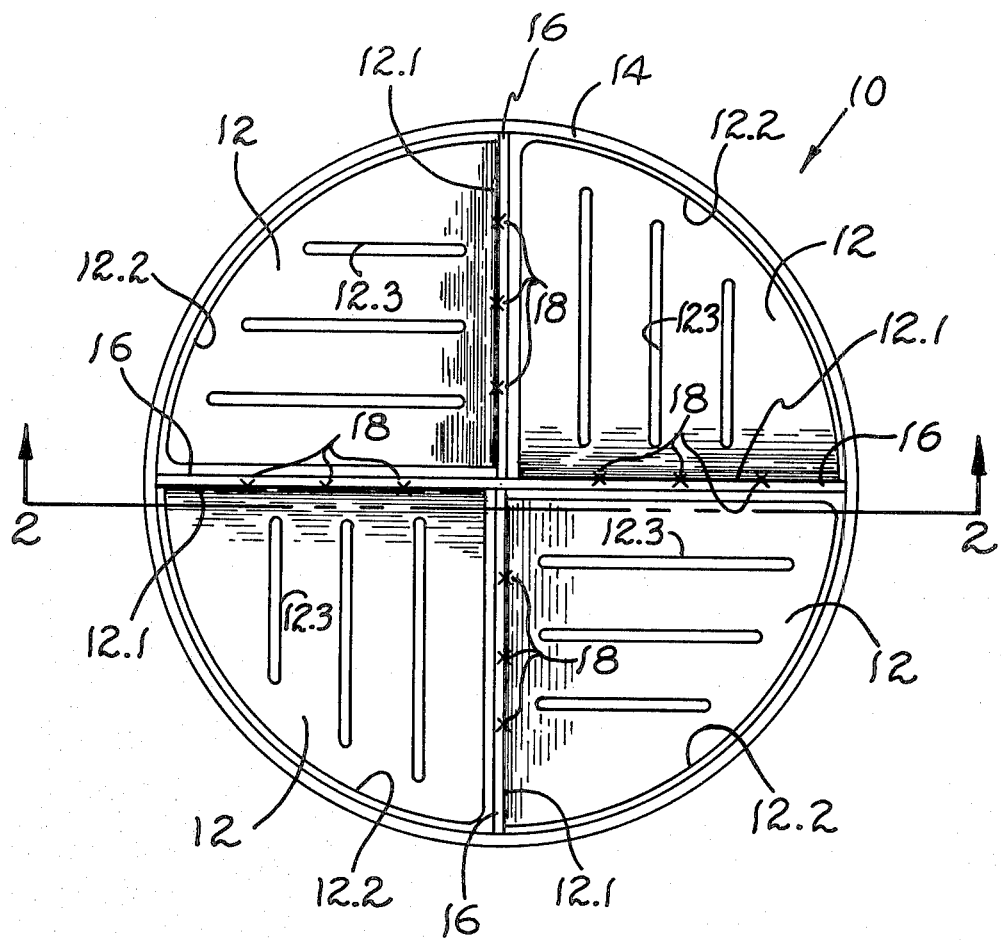
FIG. 1 is a plan view of the gas vent damper means of this invention.
Figure 2:
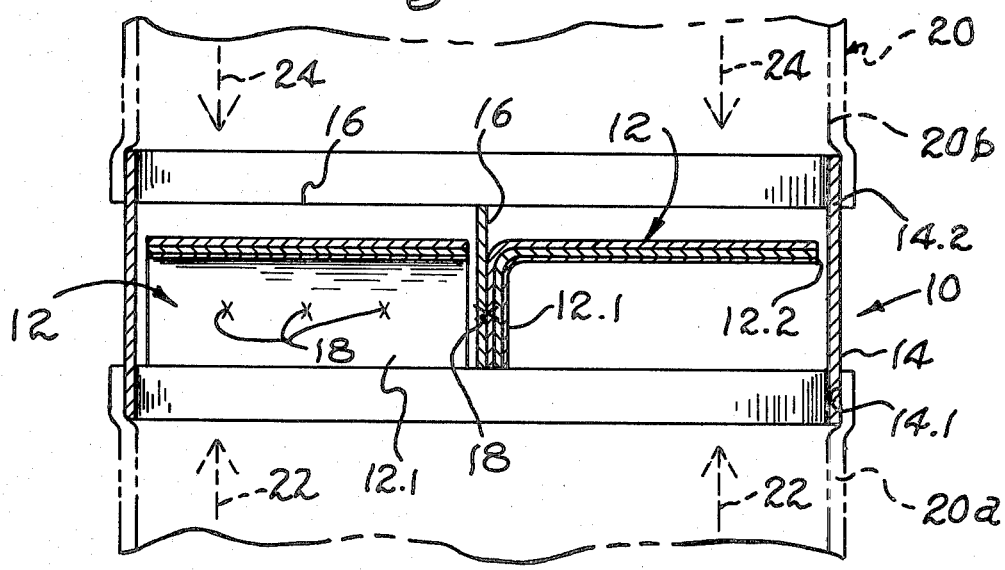
FIG. 2 is a section view along line 2—2 of FIG. 1 showing the damper means disposed in a flue-closing position and illustrating the novel and improved composite thermostat metal of this invention.
Figure 3:
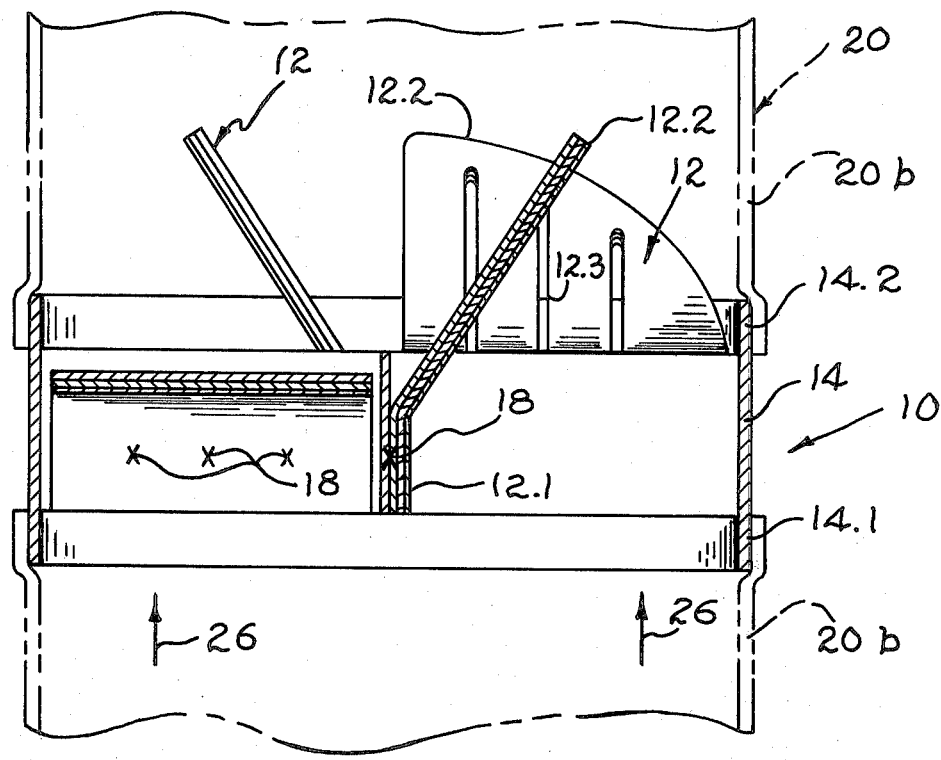
FIG. 3 is a section view similar to FIG. 2 illustrating the damper means in flue-opening position.

Referring to the drawings, 10 in FIGS. 1-3 indicates the novel and improved gas vent damper means of this invention. In a preferred embodiment, the damper means includes a plurality of vanes 12 of thermostat metal mounted on a support to be arranged in the flue of a gas-fired apparatus for movement between flue closing and flue opening positions in response to temperature change. Typically the support comprises a cylindrical damper housing 14 having brackets 16 which are welded or otherwise secured to the housing to extend across the cylinder housing diameter. Four thermally responsive vanes 12 have one end 12.1 secured to respective portions of the brackets by welds or in other conventional manner as is diagrammatically indicated at 18 in FIGS. 1-3. The opposite ends 12.2 of the vanes are preferably rounded to conform generally to the housing configuration as shown in FIG. 1. The individual vanes 12 extend across respective quadrants of the housing cylinder when they are at a temperature below a selected level. In that flue closing position, the vanes normally block any substantial flow of air or other gasses through the housing 14. However, the vanes are adapted to flex and to move to a flue opening position when the vanes are heated above that selected temperature, thereby to permit relatively free flow of gasses through the housing. In a typical embodiment, small slits 12.3 are provided in the vanes to permit some pressure equalization across the vanes without causing excessive vane vibration or humming and to achieve desired degrees of vane flexibility.

With that construction, the damper means 10 is easily mounted in the flue of a conventional gas-fired apparatus such as a home hot water heater or a furnace or the like. In that regard, it will be understood that such a flue (as diagrammatically illustrated by the broken lines 20 in FIGS. 2-3) normally extends from the combustion chamber of the apparatus (not shown) to pass outside the home or other building (also not shown) which encloses the apparatus. Accordingly, one end 14.1 of the damper housing is fitted into an enlarged diameter portion of the flue section 20a extending from the apparatus combustion chamber and the opposite end 14.2 on the housing fits within a corresponding enlarged diameter portion of the other flue section 20b to extend outside the enclosing building as will be understood. Of course the damper means is adapted to be mounted in such a flue in any other conventional manner within the scope of this invention.

In that arrangement, the thermostat metal vanes 12 of the damper means normally block the flue when no gas firing is taking place and when the vanes are at a temperature below a selected level as shown in FIG. 2. The vanes therefore block the flow of air up the flue as indicated by the arrows 22 and thereby prevent heat loss from a hot water tank or the like which might result from such air flow 22. The vanes also prevent the flow of cold air down the flue as indicated by the arrows 24 in FIG. 2 and thereby avoid the entry of cold air drafts into the home through the flue. However, when gas-firing occurs in the combustion chamber of that hot water heater or the like, the thermally responsive vanes 12 are adapted to flex and move as illustrated in FIG. 3 for permitting the hot gaseous combustion products of the gas-firing to pass up the flue and be vented outside the home as indicated by the arrows 26 in FIG. 3. As thus far described, the damper means 10 is conventional.

In accordance with this invention however the gas vent damper means 10 incorporates a novel and improved thermostat metal in the thermally responsive vanes 12. In this regard, it will be understood that the damper means 10 is preferably adapted to move from a flue closing to a flue opening position within a very short time after gas-firing of the hot water heater or the like is initated, thereby to assure proper venting of the apparatus. For that purpose, the thermostat metal of the vanes preferably has a thickness on the order of 0.006 to 0.012 inches and has a suitably high flexivity above about $100 \times 10^{-7}$ in./in./°F. Typically, for example, the vane materials have a thickness of about 0.008 inches and a flexivity of about $110 \times 10^{-7}$ in./in./°F. in the noted temperature range so that, when the damper means 10 is mounted in the flue 20 with appropriate spacing relative to the combustion chamber of the vented apparatus, the damper means are adapted to be thermally responsive to open the damper for providing adequate venting within less than about 10 seconds after the initiation of firing under typical operating conditions. It will also be understood that, in the typical gas vent applications, the thermostat metal vanes 12 are subjected to extended exposure to the relatively hot and corrosive gaseous combustion products resulting from burning of natural gas or other commercially availably gas fuels in the apparatus combustion chamber. Typically for example the vanes are subjected to repeated cycling between temperatures at room temperature level or below and temperatures up to about 750° F. Typically the vanes are also exposed to gasses such as hydrogen sulfide and the like. Accordingly, the thermostat metal incorporated in the vanes is preferably adapted to withstand such flue environment conditions for a long service life.

Figure 4:
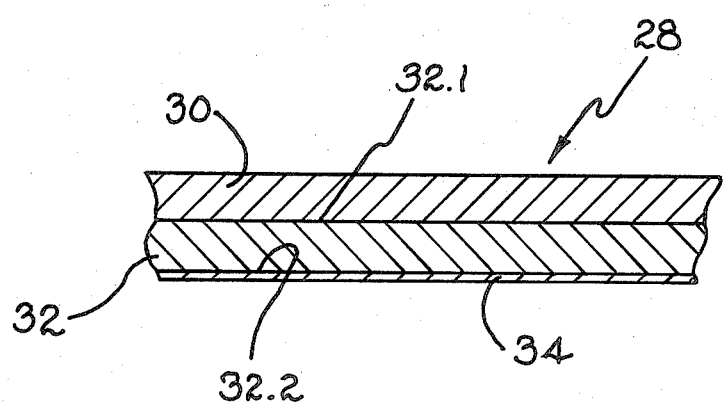
FIG. 4 is a partial section view to enlarged scale of a portion of the thermostat metal of this invention.

In accordance with this invention, these objectives are substantially achieved by forming the thermostat metal vanes 12 with a novel, low-cost three-component thermostat metal 28 as best shown in FIG. 4. In that thermostat metal, a first layer of metal 30 of selected thickness and of relatively high coefficient of thermal expansion is metallurgically bonded to one side 32.1 of a second layer of metal 32 of selected thickness and of a relatively lower coefficient of thermal expansion for primarily determining the flexivity or thermal response characteristics of the composite material, the thermostat metal also having a third, relatively very thin layer of metal 34 metallurgically bonded to the opposite side 32.2 of the low expansion metal layer. The noted metal layers are metallurgically bonded to each other as described using conventional roll bonding methods and the like for making composite thermostat metals within the scope of this invention.

In accordance with the invention, the first metal layer 30 comprises a material selected from the group of austenitic stainless steels which are adapted to be substantially free of transformation when the materials are subjected to rolling reduction in thickness or are otherwise worked or work-hardened during manufacture of the composite thermostat metal by conventional methods. Such stainless steels include some of the materials in the group commonly called 300 Series Stainless Steels, which materials are designated as SI 300 Series Stainless Steels by the American Society of Automotive Engineers and as 300 Series Stainless Steels by the American Iron and Steel Institute. Preferably for example, the metal layer 30 is formed from 305 Stainless Steel having a composition by weight of 0.12 percent (max.) carbon, 2.00 percent (max.) manganese, 1.00 percent (max.) silicon, 0.045 percent (max.) phosphorous, 0.030 percent (max.) sulfur, 17.00 to 19.00 percent chromium, 10.00 to 13.00 percent nickel, and the balance iron. Alternately layer 30 comprises 304 Stainless Steel having a composition by weight of 0.08 percent (max.) carbon, 2.00 percent (max.) manganese, 1.00 percent (max.) silicon, 0.045 percent (max.) phosphorous, 0.030 percent (max.) sulfur, 18.00 to 20.00 percent chromium, 8.00 to 12.00 percent nickel, and the balance iron.

The second metal layer 32 is formed from the very low expansion metal commonly called invar having a nominal composition by weight of 36 percent nickel and the balance iron. As will be understood, the metal alloy 32 may also incorporate up to 1.00 percent (max.) of carbon, manganese or silicon for selected applications within the scope of this invention.

In accordance with this invention, the third metal layer 34 comprises a material selected from the group of stabilized, high chromium, ferritic stainless steels which display a coefficient of thermal expansion substantially lower than the metal layer 30 and which are adapted to be subjected to conventional heat treatments and other processing steps with the above-described materials of metal layers 30 and 32 during manufacture of the composite material 28 by conventional processing steps. That is, the material of layer 34 is stabilized in conventional manner to prevent austenite formation in the layer material when the layer material is subjected to heat treatments and the like with the materials of layer 30 as above-described. Such stainless steels include some of the materials in the group commonly called 400 Series Stainless Steels, which materials are designated at 51 400 Series Stainless Steels by the American Society of Automotive Engineers and as 400 Series Stainless Steels by the American Iron and Steel Institute. The material of metal layer 34 desirably has a chromium content of at least 12 percent, and preferably at least 18 percent by weight. Preferably, for example, the metal layer 34 is formed from a titanium stabilized stainless steel commonly called 430 Ti Stainless Steel having the basic composition by weight of 430 Stainless Steel comprising 0.12 percent (max.) carbon, 1.00 percent (max.) manganese, 1.00 percent (max.) silicon, 0.040 percent (max.) phosphorous, 0.030 percent (max.) surfur, 16.00 to 18.00 percent chromium, and the balance iron and further incorporating titanium in an amount of at least about 6 times the carbon content of the basic composition. Alternately layer 34 is formed of other conventional weldable or glass sealable ferritic stainless such as 439 Stainless Steel having a composition by weight of 0.12 percent (max.) carbon, 1.00 percent (max.) manganese, 1.00 percent (max.) silicon, 0.040 percent (max.) phosphorous, 0.030 percent (max.) sulfur, 16.00 to 18.00 percent chromium, titanium in amount up to at least about 6 times the carbon content, and the balance iron.

Preferably the thickness of the metal layer 34 is selected to be at least about 5 percent of the total thickness of the composite material 28 so that, when the composite material is reduced to the desired thickness for firing the thermostat metal vanes 12, the thickness of the metal layer 34 is sufficient to provide substantial corrosion protection for the material of the metal layer 28 in a gas flue environment. On the other hand, the thickness of layer 34 is desirably kept relatively small so that the flexivity of the composite material is not substantially reduced by the presence of the layer 34 on the low expansion side of the composite. The relative thicknesses of the other metal layers 30 and 32 are selected to provide the composite material 28 with a desired flexibility in convential manner.

Preferably, for example, the composite material 28 incorporates a layer of 305 Stainless Steel in layer 30 and embodies an alloy of 36 percent nickel and the balance iron, by weight, in the metal layer 32, those metal layers having thicknesses comprising about 43 percent and 48 percent respectively of the total thickness of the composite material 28. The third layer 34 embodies 430 Ti Stainless Steel as above described and has a thickness comprising about 5 percent of the composite thickness. That composite material utilizes low cost materials which are widely available from a variety of sources and which are free of large constituents of materials such as cobalt which are in relatively short supply. The described metal layers are readily bonded together in the described manner utilizing conventional procedures for making composite thermostat metals. As described, the composite provides a flexivity or thermal response property of about $110 \times 10^{-7}$ in./in./°F. in the temperature range of about 50° to 200° F. and is therefore adapted to move promptly and to a substantial extent in the damper means 10 for opening and closing the flue 20 in response to temperature changes. The layer 30 not only serves as the high expansion layer of the composite but also provides excellent corrosion resistance in the flue environment of a gas-fired apparatus. The second metal layer 32 has the very low thermal expansion properties which permit the layer material to cooperate with the metal layer 30 in achieving that desired flexivity and the third layer metal has thermal expansion properties which do not excessively reduce that flexivity while also providing desired corrosion protection for the low expansion layer material 32 in the gas flue environment. Accordingly the objectives of this invention are achieved.

It should be understood that although particular embodiments of the invention have been described by way of illustrating the invention, this invention includes all modifications and equivalents of the disclosed embodiments falling within the scope of the appended claims.

I claim:

1. A composite thermostat metal for use in the flue of a gas-fired apparatus comprising a first layer of metal of selected thickness and relatively high coefficient of thermal expansion and of work-hardened austenitic stainless steel metallurgically bonded to a first side of a second layer of work-hardened metal of a selected thickness and relatively low coefficient of thermal expansion having a nominal composition by weight of 36 percent nickel and the balance iron for primarily determining the flexivity characteristics of the composite thermostat metal characterized in that the metal of the first layer is selected from the group consisting of those AISI Serious 300 Stainless Steels having high corrosion resistance properties and relatively high coefficients of thermal expansion which are characterized by being substantially free of transformation during work-hardening so that they retain their relatively high coefficients of thermal expansion when placed in work-hardened condition in the thermostat metal and in that a third layer of metal selected from the group consisting of stabilized, high chromium, ferritic stainless steels in the AISI Series 400 Stainless Steels characterized by having relatively lower coefficient of thermal expansion than said first layer material and relatively greater corrosion resistance than said second layer material is metallurgically bonded to the opposite side of the second metal layer, the third layer being work-hardened and having a thickness comprising at least about 5 percent of the total thickness of the composite thermostat metal for providing corrosion protection for the second metal layer in the flue environment, and the first and second layers having a selected thickness for cooperating with the third layer for providing the thermostat metal with a flexivity at a temperature in the range from 50° to 200° F. of at least about $100 \times 10^{-7}$ in./in./°F.

2. A composite thermostat metal as set forth in claim 1 wherein the stainless steel material of said first metal layer comprises AISI 305 Stainless Steel.

3. A composite thermostat metal as set forth in claim 2 wherein the stainless steel material of said third metal layer comprises a titanium bearing material commonly identified by the designation AISI 430 TI Stainless Steel.

4. A thermally responsive damper means for the flue of a gas-fired apparatus comprising means to be mounted in the flue for movement between a first flue closing position and a second flue-opening position in response to selected temperature change, said means embodying a composite thermostat metal having a first layer of metal of selected thickness and relatively high coefficient of thermal expansion and of work-hardened austenitic stainless steel metallurgically bonded to a first side of a second layer of work-hardened metal of a selected thickness and relatively low coefficient of thermal expansion having a nominal composition by weight of 36 percent nickel and the balance iron for primarily determining the flexivity characteristics of the composite thermostat metal to move the thermostat metal between said flue opening and closing positions in response to selected temperature change characterized in that the metal of the first layer is selected from the group consisting of those AISI Series 300 Stainless Steels having high corrosion resistance properties and relatively high coefficients of thermal expansion which are characterized by being substantially free of transformation during work-hardening so that they retain their relatively high coefficients of thermal expansion when placed in work-hardened condition in the thermostat metal and in that a third layer of metal selected from the group consisting of stabilized, high chromium, ferritic stainless steels in the AISI Series 400 Stainless Steels characterized by having relatively lower coefficient of thermal expansion than said first layer material and relatively greater corrosion resistance than said second layer materal is metallurgically bonded to the opposite side of the second metal layer, the third layer being work-hardened and having a thickness comprising at least about 5 percent of the total thickness the composite thermostat metal for providing corrosion protection for the second metal layer in the flue environment, and the first and second layers having a selected thickness for cooperating with the third layer for providing the thermostat metal with a flexivity at a temperature in the range from 50° to 200° F. of at least about $100 \times 10^{-7}$ in./in./°F.

5. A damper means as set forth in claim 4 wherein the stainless steel material of said first metal layer comprises AISI 305 Stainless Steel having a thickness comprising 47 percent of the total thickness of the composite thermostat metal, and the stainless steel material of the third metal layer comprises a titanium bearing material commonly identified by the designation AISI 430 Ti stainless Steel having a thickness comprising about 5 percent of the total thickness of the composite thermostat metal.

* * * * *